(12) United States Patent
Michel et al.

(10) Patent No.: US 11,620,154 B2
(45) Date of Patent: Apr. 4, 2023

(54) SUPPRESSING INTERRUPTS TO AN APPLICATION THREAD

(71) Applicant: International Business Machines Corporation, Armonk, NY (US)

(72) Inventors: Dirk Michel, Austin, TX (US); Bret R. Olszewski, Austin, TX (US); Matthew R. Ochs, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 126 days.

(21) Appl. No.: 16/732,856

(22) Filed: Jan. 2, 2020

(65) Prior Publication Data

US 2021/0208926 A1  Jul. 8, 2021

(51) Int. Cl.
*G06F 9/48* (2006.01)

(52) U.S. Cl.
CPC .................. *G06F 9/4812* (2013.01)

(58) Field of Classification Search
CPC ...... G06F 9/4812; G06F 13/24; G06F 9/5027; G06F 9/5083
See application file for complete search history.

(56) References Cited

U.S. PATENT DOCUMENTS

| 6,467,008 | B1* | 10/2002 | Gentry, Jr. | .......... | H04L 47/6225 |
|---|---|---|---|---|---|
| | | | | | 710/261 |
| 6,697,870 | B1* | 2/2004 | Cafarelli, III | .......... | H04L 43/18 |
| | | | | | 709/224 |
| 8,463,971 | B2 | 6/2013 | Solomita et al. | | |
| 9,262,354 | B2* | 2/2016 | Li | .......... | H04L 69/165 |

(Continued)

FOREIGN PATENT DOCUMENTS

| CN | 103634230 A | | 3/2014 |
|---|---|---|---|
| KR | 20070019136 A | * | 2/2007 |

OTHER PUBLICATIONS

Park, Hyun-Suk, KR20070019136A Description Translation, Feb. 15, 2007, [database online], [retrieved on Dec. 7, 2021] Retrieved from Espacenet using Internet <URL:https://worldwide.espacenet.com/publicationDetails/description?CC=KR&NR=20070019136A&KC=A&FT=D&ND=3&date=20070215&DB=&locale=en_EP>, pp. 1-6 (Year: 2007).*

(Continued)

*Primary Examiner* — Meng Ai T An
*Assistant Examiner* — Hsing Chun Lin
(74) *Attorney, Agent, or Firm* — Garg Law Firm, PLLC; Rakesh Garg; Nathan Rau (57) ABSTRACT

In a computing system, an application thread is executed on a hardware thread. Based on a configuration of the computing system, a first threshold is determined comprising a threshold percentage of execution time spent servicing a set of interrupts to the application thread relative to a total execution time for the hardware thread. For the hardware thread, a length of a first time period spent servicing an interrupt in the set of interrupts and a length of a second time period spent executing the application thread are measured. A cumulative percentage of execution time spent in the first time period relative to execution time spent in the first time period and the second time period is calculated. Responsive to the cumulative percentage being above the threshold percentage, interrupt servicing on the hardware thread is disabled.

8 Claims, 6 Drawing Sheets

(56) References Cited

U.S. PATENT DOCUMENTS

| | | | |
|---|---|---|---|
| 9,513,965 B1* | 12/2016 | Kurihara | G06F 9/5083 |
| 9,542,345 B2 | 1/2017 | Cheshire | |
| 2006/0112208 A1 | 5/2006 | Accapadi et al. | |
| 2009/0300317 A1* | 12/2009 | Hepkin | G06F 9/5077 |
| | | | 711/173 |
| 2011/0072180 A1* | 3/2011 | Lee | G06F 13/24 |
| | | | 710/260 |
| 2011/0145461 A1* | 6/2011 | Zhao | G06F 9/505 |
| | | | 710/267 |
| 2012/0272016 A1* | 10/2012 | Bello | G06F 9/5077 |
| | | | 711/154 |
| 2016/0210050 A1* | 7/2016 | Hyun | G06F 3/0659 |
| 2018/0137052 A1* | 5/2018 | Boyle | G06F 12/084 |

OTHER PUBLICATIONS

Expresslogic, Preemption-Threshold™ Scheduling Enables Real-Time Systems to Achieve Higher Performance, Jun. 2019, https://rtos.com/wp-content/uploads/2017/10/EL_PTS_Improves_Performance.pdf.

Regehr et al., Preventing Interrupt Overload, ACM SIGPLAN Notices, 40(7), pp. 50-58, LCTES'05 Jun. 15-17, 2005, Chicago, Illinois, USA.

* cited by examiner

SUPPRESSING INTERRUPTS TO AN APPLICATION THREAD

TECHNICAL FIELD

The present invention relates generally to a method, system, and computer program product for interrupt management in a threaded environment. More particularly, the present invention relates to a method, system, and computer program product for suppressing interrupts to an application thread.

BACKGROUND

An application thread is a sequence of program instructions. A hardware thread is a processor resource that executes an application thread. When a dispatcher module of an operating system supporting threaded execution has an application thread ready for execution, the dispatcher selects an idle hardware thread, assigns the ready application thread to the selected hardware thread, and directs the processor to begin executing the application thread on the hardware thread. When the application thread completes execution or exceeds an allotted time of execution, the dispatcher stops execution of the original application thread and assigns a new, ready application thread to the hardware thread. A dispatcher typically follows a scheduling policy, including provisions for ensuring that application threads receive the execution time they require and that execution time is appropriately distributed among hardware threads.

An input/output (I/O) interrupt, or interrupt, is an input signal to a processor indicating an I/O event that needs immediate attention. As used herein, an interrupt refers only to interrupts associated with I/O, for example for storage and networking applications, and not to interrupts associated with other system events such as page faults and machine check interrupts. Typically, a computer system processes input/output using an interrupt model, to ensure that time-critical events such as network traffic are handled sufficiently quickly. Thus, when an interrupt occurs, the dispatcher interrupts an executing application thread, allowing an interrupt handler for the interrupt to begin executing in place of the interrupted application thread. When the interrupt handler completes handling the interrupt, the interrupted application thread resumes execution on its hardware thread. A dispatcher typically follows an interrupt distribution policy in distributing interrupt handling among executing application threads.

SUMMARY

The illustrative embodiments provide a method, system, and computer program product. An embodiment includes a method that executes, in a computing system, an application thread on a hardware thread. An embodiment determines, based on a configuration of the computing system, a first threshold, the first threshold comprising a threshold percentage of execution time spent servicing a set of interrupts to the application thread relative to a total execution time for the hardware thread, the total execution time comprising time spent servicing the set of interrupts and time spent servicing the application thread. An embodiment measures, for the hardware thread, a length of a first time period spent servicing an interrupt in the set of interrupts and a length of a second time period spent executing the application thread. An embodiment calculates a cumulative percentage of execution time spent in the first time period relative to execution time spent in the first time period and the second time period. An embodiment disables, responsive to the cumulative percentage being above the threshold percentage, interrupt servicing on the hardware thread.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that a hardware thread can execute either an interrupt handler or an application thread, but only one at a time. As a result, using a hardware thread to perform interrupt servicing reduces time available for application thread execution on the same hardware thread. Reducing time available for application thread execution lengthens time taken to complete execution of an application thread and delays dispatching of a new application thread onto the hardware thread, reducing application responsiveness. Some interrupt handlers (e.g. for processing a single network packet) have a sufficiently short execution time that overall system performance is minimally affected. However, other interrupt handlers (e.g. for processing multiple incoming packets as a group) have a longer execution time. This longer execution time can disproportionately reduce overall system performance, particularly if an operating system routes interrupts onto one particular hardware thread, assigns application threads onto one particular hardware thread, or both. Suppressing interrupts to an application thread for a time, as long as sufficient system resources remain available to process interrupts, is one technique to restore system performance in such circumstances. Consequently, the illustrative embodiments recognize that there is an unmet need to temporarily suppress interrupts to an application thread executing on a hardware thread.

The illustrative embodiments recognize that the presently available tools or solutions do not address these needs or provide adequate solutions for these needs. The illustrative embodiments used to describe the invention generally address and solve the above-described problems and other problems related to suppressing interrupts to an application thread.

An embodiment can be implemented as a software application. The application implementing an embodiment can be configured as a modification of an existing thread management system, as a separate application that operates in conjunction with an existing thread management system, a standalone application, or some combination thereof. A thread management system can be implemented as part of an operating system, hypervisor, ultravisor, or in hardware.

Particularly, some illustrative embodiments provide a method that determines, for an application thread executing on a hardware thread, that a cumulative percentage of execution time spent servicing interrupts relative to execution time spent servicing interrupts and executing the application thread exceeds a threshold. If the threshold has been exceeded, the method disables interrupt servicing of the hardware thread for a time.

An embodiment executes an application thread on a hardware thread in a computing system. When an interrupt requires servicing, an embodiment interrupts the application thread and uses the hardware thread to service the interrupt. When the hardware thread is no longer needed for interrupt servicing, the embodiment resumes executing the application thread on the hardware thread.

Based on a configuration of the computing system, an embodiment determines, for a hardware thread, a threshold percentage of execution time spent servicing a set of interrupts to the application thread relative to a total time the spent servicing the set of interrupts and time spent servicing the interrupted application thread. Above the threshold, the hardware thread is spending too much time servicing interrupts, and not enough time servicing the application thread. As a result, application thread performance is being affected too greatly, and interrupts to this application thread should be suppressed for a time.

In one embodiment, one threshold applies to all application threads. One embodiment sets the threshold based on one or more interrupt source factors. The factors include the number of interrupt sources in the computing system, the rate at which those sources generate interrupts, the time needed to service the generated interrupts, throughput of the interrupt sources, device class of each interrupt source, another property specific to an interrupt source, and other factors related to interrupt sources in the computing system. The factors also include the operating system's interrupt and application thread scheduling and distribution policies. For example, a system with four installed network adapters is likely to generate more interrupts per unit of time than a system with two installed network adapters. As another example, a system with a high-throughput network adapter is likely to generate more interrupts per unit of time than a system with a lower-throughput network adapter, because of the greater amount of traffic handled by the high-throughput adapter. As a third example, a network adapter that groups incoming packets will generate fewer interrupts but take longer to service each interrupt, because of the number of packets that must be processed during each interrupt period. As a fourth example, a disk adapter might require fewer interrupts or less processing time per interrupt than a network adapter.

Another embodiment implements a responsiveness classification for application threads, and determines a threshold for an application thread based on the application thread's responsiveness classification. For example, consider a system with two responsiveness classifications, high and low. Application threads in the high responsiveness class can tolerate less time being interrupted than application threads in the low responsiveness class before thread performance falls below performance criteria. As a result, an application thread classified as having high responsiveness might require a lower threshold than an application thread classified as having low responsiveness. Another embodiment implements a threshold for one or more application threads, based on the threads' responsiveness classification, but does not implement a threshold for other application threads.

Another embodiment initially sets one or more thresholds in a manner described herein, then uses a set of system performance metrics to adjust one or more thresholds to improve system performance. One embodiment uses a learning mechanism to adjust one or more thresholds. Techniques for adjusting thresholds using an optimization process and using a learning mechanism are presently available.

For each hardware thread subject to interrupt suppression, an embodiment measures a time period spent servicing each interrupt on the hardware thread and a time period spent executing an application thread instead. One embodiment collects a timestamp of the starting time and ending time of each interrupt service, and uses the difference between the ending and starting timestamps as the time period spent servicing the interrupt. Time spent not servicing an interrupt is time period spent executing an application thread instead.

From the measured time data for a hardware thread, an embodiment periodically calculates a cumulative percentage of execution time spent servicing interrupts relative to total execution time since the application thread began executing on the hardware thread. For example, if the application thread began executing 100 milliseconds ago, and a total of 10 milliseconds was spent servicing interrupts, the cumulative percentage of execution time spent servicing interrupts relative to total execution time is 10 percent. One embodiment calculates the cumulative percentage once per second, although other period lengths, both longer and shorter, are also possible and contemplated within the scope of the illustrative embodiments.

If the cumulative percentage exceeds the threshold, the hardware thread is spending too much time servicing interrupts, and not enough time servicing the application thread. As a result, application thread performance is being affected too greatly, and interrupts to this application thread should be suppressed for a time. Consequently, an embodiment disables interrupt servicing on the hardware thread.

Another embodiment, before disabling interrupt servicing on a hardware thread, cooperates with the interrupt generating software to attempt to reduce worst case interrupt dispatching latency. In particular, an embodiment requests that the interrupt generating software delays interrupt generation for a predetermined time period (e.g. 20 microseconds), in order to process any additional interrupts that occur in a group. Group processing can be more efficient than processing interrupts individually, but can increase the worst case scheduling delay time.

Another embodiment, before disabling interrupt servicing on a hardware thread, determines how many hardware threads of the computer system already have disabled interrupt servicing. If the number of already-disabled hardware threads is below an interrupt throughput threshold, the embodiment disables interrupt servicing on the hardware thread. However, if the number of already-disabled hardware threads is at or above the interrupt throughput threshold, the embodiment does not disable interrupt servicing on the hardware thread, to ensure that the computer system always has at least one or more hardware threads on which interrupt servicing can be performed. For example, on a computing system with eight hardware threads, the interrupt throughput threshold might be set to six. As a result, if interrupt servicing has already been disabled for six hardware threads, two hardware threads are still available to service interrupts. An embodiment sets the interrupt throughput threshold based on the interrupt source factors described herein.

When interrupt servicing has been disabled on a hardware thread, an embodiment reenables interrupt servicing when the original application thread executing on the hardware thread is retired and a new application thread begins executing on the hardware thread. When a new application thread begins executing on the hardware thread, an embodiment also clears time data and the cumulative interruption percentage for the previous application thread and commences collecting time data and calculating a cumulative interrupt percentage for the new application thread.

When interrupt servicing has been disabled on a hardware thread, an embodiment determines whether a number of interrupts occurring on the computing system within a measurement time period are below an interrupt threshold. If the number of interrupts per time period is below a threshold number of interrupts, the embodiment reenables interrupt servicing of one or more hardware threads. In one embodiment, the interrupt threshold has a predetermined value. In another embodiment, the interrupt threshold has a value related to the number of interrupts per time period when interrupt servicing was disabled on a hardware thread. For example, if there were 500,000 interrupts per second when interrupt servicing was disabled on a hardware thread, and now the number of interrupts is 5,000 per second, or one percent of the original value, interrupt servicing can be reenabled on the hardware thread. Another embodiment implements multiple interrupt number thresholds, and each time the number of interrupts per time period falls below a next lower threshold, reenables interrupt servicing for another hardware thread or group of hardware threads.

The manner of suppressing interrupts to an application thread described herein is unavailable in the presently available methods in the technological field of endeavor pertaining to hardware thread management. A method of an embodiment described herein, when implemented to execute on a device or data processing system, comprises substantial advancement of the functionality of that device or data processing system in determining, for an application thread executing on a hardware thread, that a cumulative percentage of execution time spent servicing interrupts relative to execution time spent servicing interrupts and executing the application thread exceeds a threshold. If the threshold has been exceeded, the method disables interrupt servicing of the hardware thread for a time.

The illustrative embodiments are described with respect to certain types of interrupt handlers, application threads, hardware threads, scheduling policies, dispatchers, interrupt routers, interrupt sources, thresholds, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
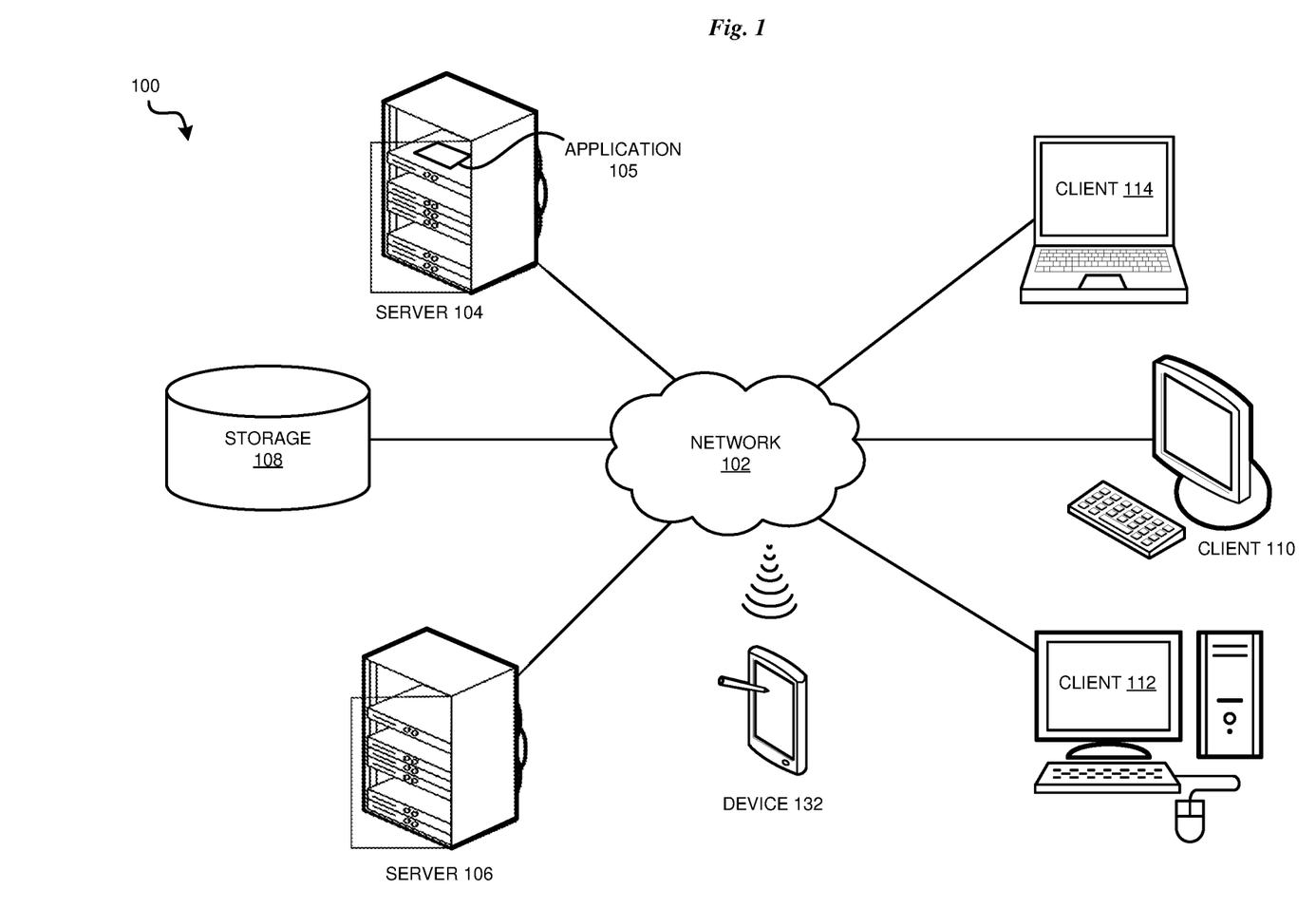
FIG. 1 depicts a block diagram of a network of data processing systems in which illustrative embodiments may be implemented.
Figure 2:
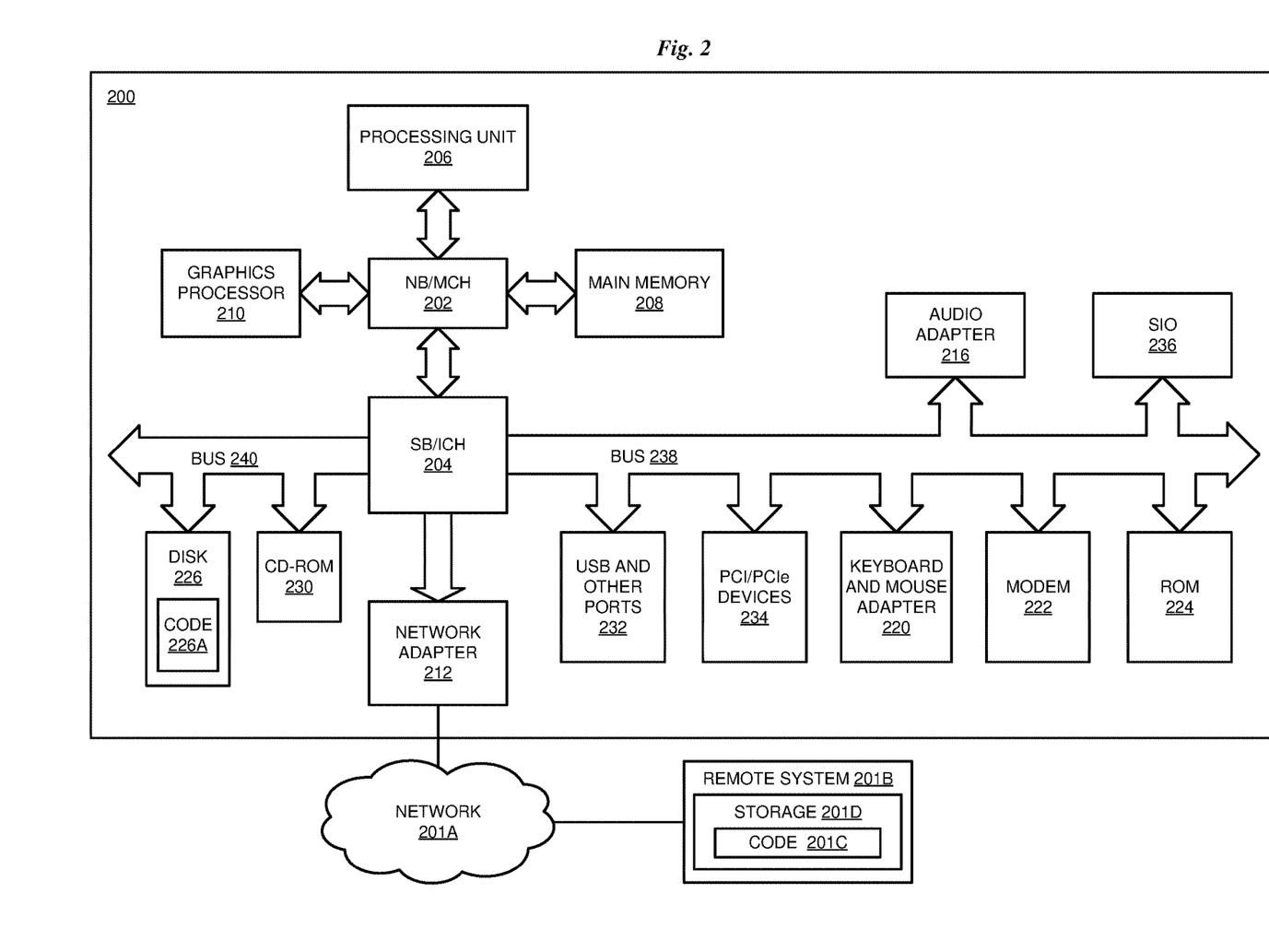
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D, in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
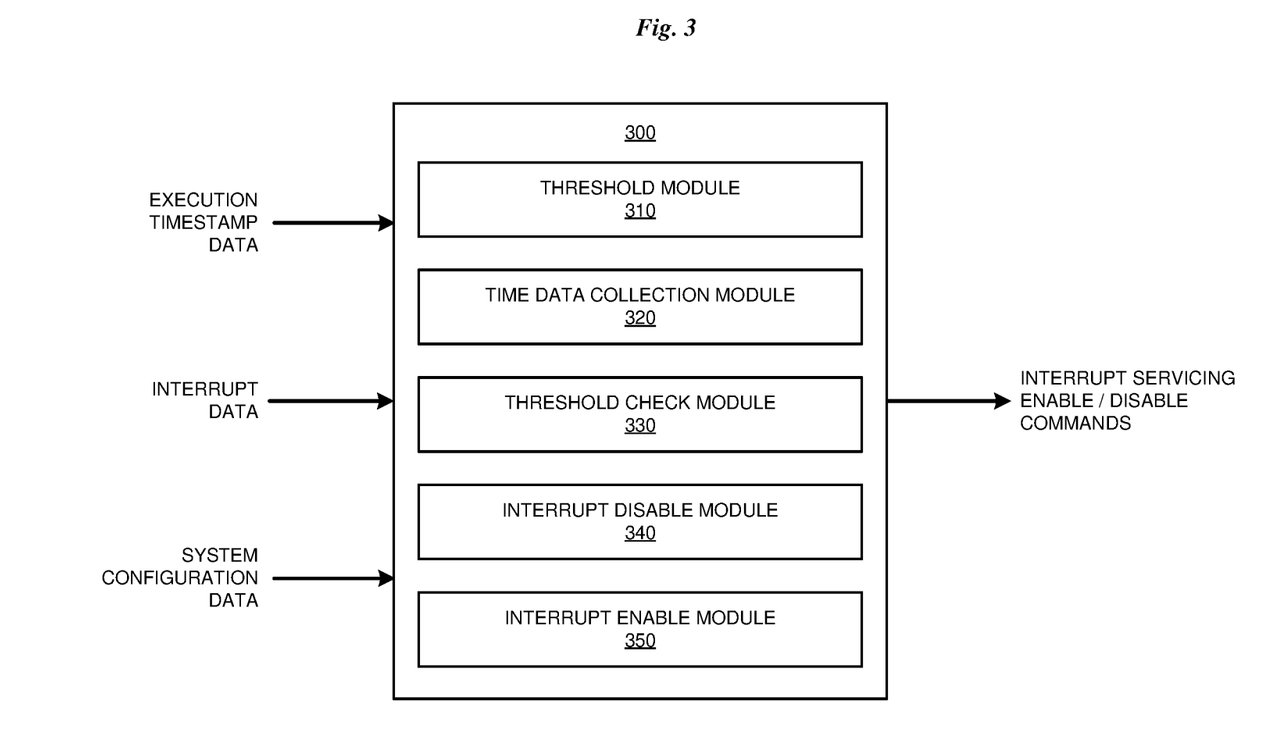
FIG. 3 depicts a block diagram of an example configuration for suppressing interrupts to an application thread in accordance with an illustrative embodiment.

With reference to FIG. 3, this figure depicts a block diagram of an example configuration for suppressing interrupts to an application thread in accordance with an illustrative embodiment. Application 300 is an example of application 105 in FIG. 1 and executes in any of servers 104 and 106, clients 110, 112, and 114, and device 132 in FIG. 1.

Application 300 executes an application thread on a hardware thread in a computing system. When an interrupt requires servicing, application 300 interrupts the application thread and uses the hardware thread to service the interrupt. When the hardware thread is no longer needed for interrupt servicing, application 300 resumes executing the application thread on the hardware thread.

Based on a configuration of the computing system, threshold module 310 determines, for a hardware thread, a threshold percentage of execution time spent servicing a set of interrupts to the application thread relative to a total time the spent servicing the set of interrupts and time spent servicing the interrupted application thread. Above the threshold, the hardware thread is spending too much time servicing interrupts, and not enough time servicing the application thread. As a result, application thread performance is being affected too greatly, and interrupts to this application thread should be suppressed for a time.

In one implementation of module 310, one threshold applies to all application threads. Module 310 sets the threshold based on one or more interrupt source factors. The factors include the number of interrupt sources in the computing system, the rate at which those sources generate interrupts, the time needed to service the generated interrupts, throughput of the interrupt sources, and other factors related to interrupt sources in the computing system. The factors also include the operating system's interrupt and application thread scheduling and distribution policies.

Another implementation of module 310 implements a responsiveness classification for application threads, and determines a threshold for an application thread based on the application thread's responsiveness classification. Another implementation of module 310 implements a threshold for one or more application threads, based on the threads' responsiveness classification, but does not implement a threshold for other application threads. Another implementation of module 310 initially sets one or more thresholds in a manner described herein, then uses a set of system performance metrics to adjust one or more thresholds to improve system performance. One implementation of module 310 uses a learning mechanism to adjust one or more thresholds.

For each hardware thread subject to interrupt suppression, time data collection module 320 measures a time period spent servicing each interrupt on the hardware thread and a time period spent executing an application thread instead. In particular, module 320 collects a timestamp of the starting time and ending time of each interrupt service, and uses the difference between the ending and starting timestamps as the time period spent servicing the interrupt. Time spent not servicing an interrupt is time period spent executing an application thread instead.

From the measured time data for a hardware thread, threshold check module 330 periodically calculates a cumulative percentage of execution time spent servicing interrupts relative to total execution time since the application thread began executing on the hardware thread. One implementation of module 330 calculates the cumulative percentage once per second.

If the cumulative percentage exceeds the threshold, the hardware thread is spending too much time servicing interrupts, and not enough time servicing the application thread. As a result, application thread performance is being affected too greatly, and interrupts to this application thread should be suppressed for a time. Consequently, interrupt disable module 340 disables interrupt servicing on the hardware thread.

Before disabling interrupt servicing on a hardware thread, module 340 determines how many hardware threads of the computer system already have disabled interrupt servicing. If the number of already-disabled hardware threads is below an interrupt throughput threshold, module 340 disables interrupt servicing on the hardware thread. However, if the number of already-disabled hardware threads is at or above the interrupt throughput threshold, module 340 does not disable interrupt servicing on the hardware thread, to ensure that the computer system always has at least one or more hardware threads on which interrupt servicing can be performed.

When interrupt servicing has been disabled on a hardware thread, interrupt enable module 350 reenables interrupt servicing when the original application thread executing on the hardware thread is retired and a new application thread begins executing on the hardware thread. When a new application thread begins executing on the hardware thread, application 300 also clears time data and the cumulative interruption percentage for the previous application thread. Module 320 commences collecting time data and module 330 commences calculating a cumulative interrupt percentage for the new application thread.

When interrupt servicing has been disabled on a hardware thread, module 350 determines whether a number of interrupts occurring on the computing system within a measurement time period are below an interrupt threshold. If the number of interrupts per time period is below a threshold number of interrupts, module 350 reenables interrupt servicing of one or more hardware threads. In one implementation of module 350, the interrupt threshold has a predetermined value. In another implementation of module 350, the interrupt threshold has a value related to the number of interrupts per time period when interrupt servicing was disabled on a hardware thread. Another implementation of module 350 uses multiple interrupt number thresholds, and each time the number of interrupts per time period falls below a next lower threshold, reenables interrupt servicing for another hardware thread or group of hardware threads.

Figure 4:
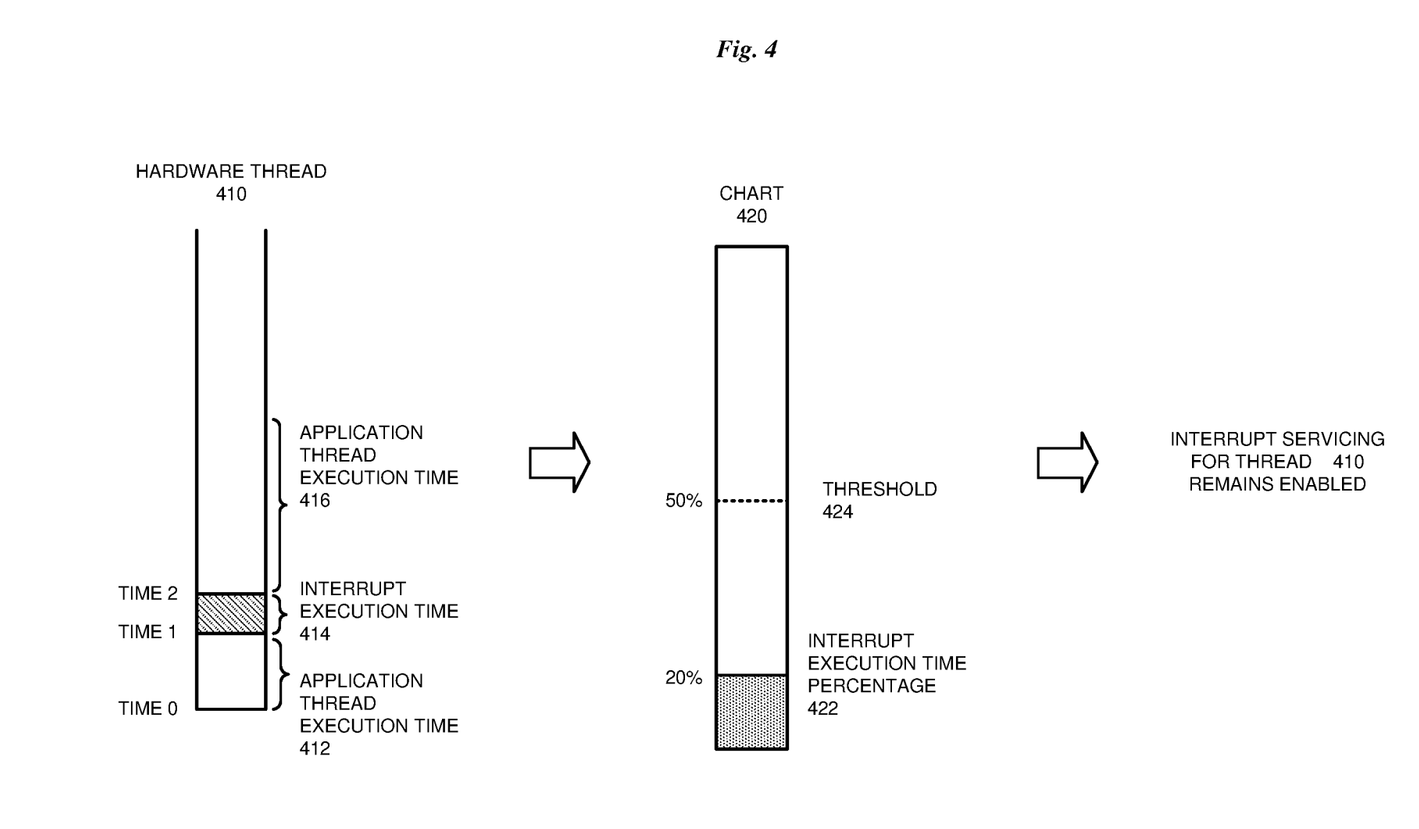
FIG. 4 depicts an example of suppressing interrupts to an application thread in accordance with an illustrative embodiment.

With reference to FIG. 4, this figure depicts an example of suppressing interrupts to an application thread in accordance with an illustrative embodiment. The example can be executed using application 300 in FIG. 3.

As depicted, an application thread executes on hardware thread 410 between time 0 and time 1. The difference between time 1 and time 0 is application thread execution time 412. At time 1, the application thread is interrupted and an interrupt handler begins executing on hardware thread 410. At time 2, the interrupt handler completes and the application thread resumes executing on hardware thread 410. Thus, the difference between time 2 and time 1 is interrupt execution time 414. Application thread execution time 416 continues from time 2 until the next interrupt or until the application thread completes execution.

Chart 420 depicts threshold 424, the threshold percentage of execution time spent servicing interrupts to the application thread relative to a total time the spent servicing the and time spent servicing the interrupted application thread. Threshold 424 is specific to hardware thread 410. From the measured time data for hardware thread 410, application 300 periodically calculates a cumulative percentage of execution time spent servicing interrupts relative to total execution time since the application thread began executing on the hardware thread. Thus, chart 420 depicts interrupt execution time percentage 422 relative to threshold 424. Because percentage 422 is below threshold 424, application 300 keeps interrupt servicing enabled for hardware thread 410.

Figure 5:
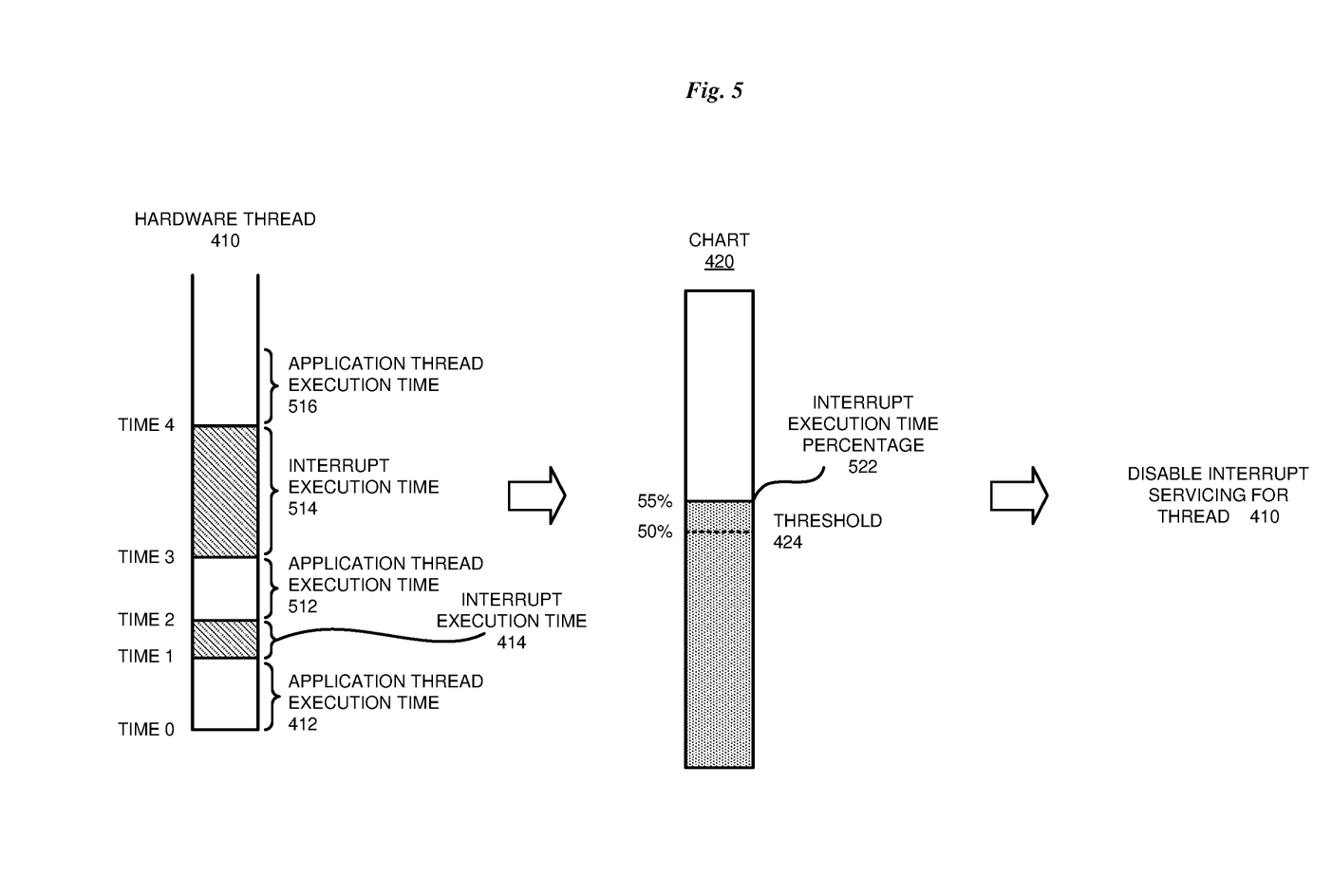
FIG. 5 depicts a continued example of suppressing interrupts to an application thread in accordance with an illustrative embodiment.

With reference to FIG. 5, this figure depicts a continued example of suppressing interrupts to an application thread in accordance with an illustrative embodiment. The example can be executed using application 300 in FIG. 3. Hardware thread 410, application thread execution time 412, interrupt execution time 414, times 0, 1, and 2, chart 420, and threshold 424 are the same as hardware thread 410, application thread execution time 412, interrupt execution time 414, times 0, 1, and 2, chart 420, and threshold 424 in FIG. 4.

As depicted, an application thread continues to execute on hardware thread 410 between time 2 and time 3. The difference between time 3 and time 2 is application thread execution time 512. At time 3, the application thread is interrupted and an interrupt handler begins executing on hardware thread 410. At time 4, the interrupt handler completes and the application thread resumes executing on hardware thread 410. Thus, the difference between time 4 and time 3 is interrupt execution time 514. Application thread execution time 516 continues from time 4 until the next interrupt or until the application thread completes execution.

From the measured time data for hardware thread 410, application 300 periodically calculates a cumulative percentage of execution time spent servicing interrupts relative to total execution time since the application thread began executing on the hardware thread. Thus, chart 420 now depicts interrupt execution time percentage 522 relative to threshold 424. Because percentage 522 is now above threshold 424, application 300 disables interrupt servicing for hardware thread 410.

Figure 6:
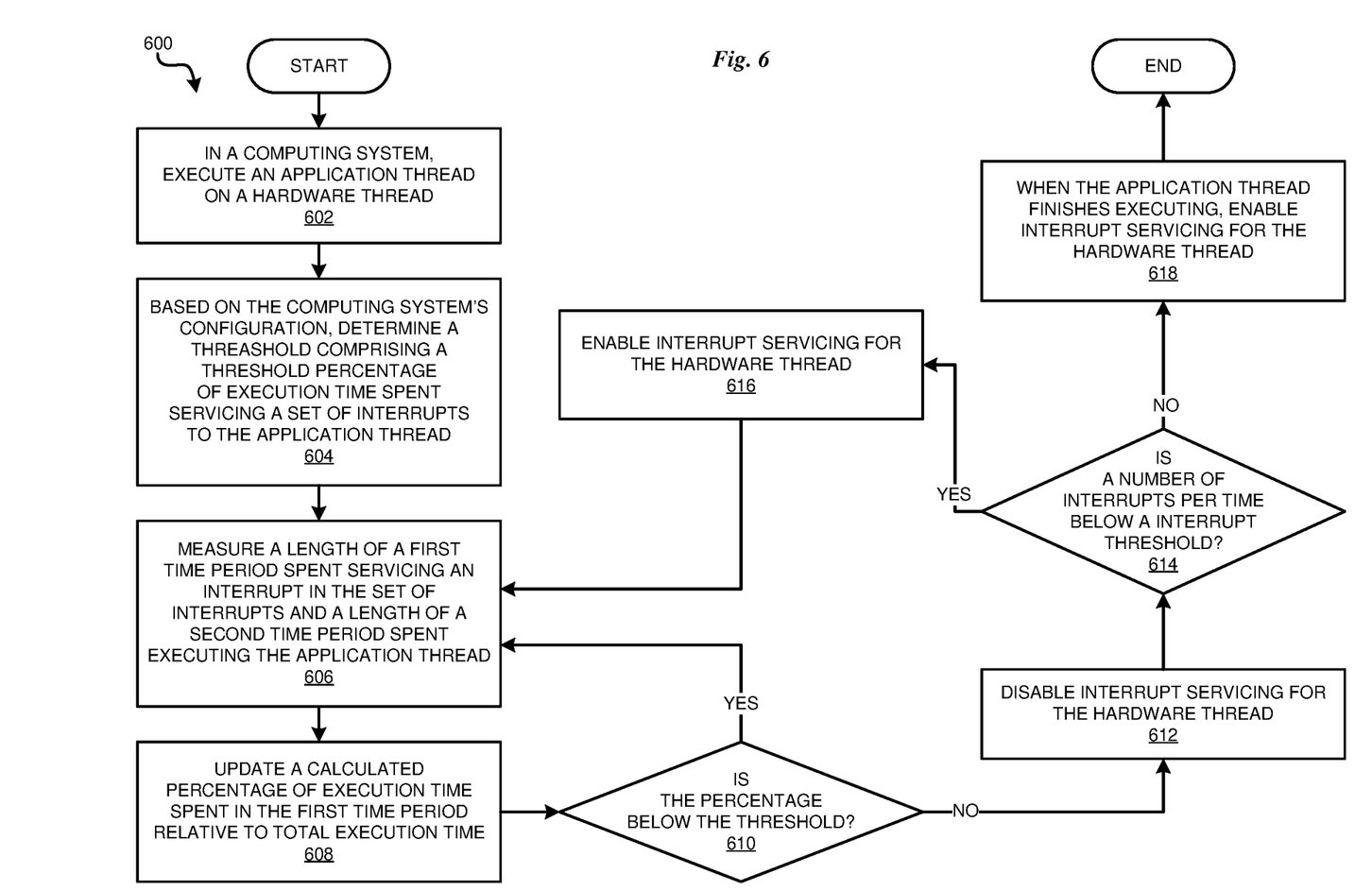
FIG. 6 depicts a flowchart of an example process for suppressing interrupts to an application thread in accordance with an illustrative embodiment.

With reference to FIG. 6, this figure depicts a flowchart of an example process for suppressing interrupts to an application thread in accordance with an illustrative embodiment. Process 600 can be implemented in application 300 in FIG. 3.

In block 602, the application, in a computing system, executes an application thread on a hardware thread. In block 604, the application, based on the computing system's configuration, determines a threshold comprising a threshold percentage of execution time spent servicing a set of interrupts to the application thread. In block 606, the application measures a length of a first time period spent servicing an interrupt in the set of interrupts and a length of a second time period spent executing the application thread. In block 608, the application updates a calculated percentage of execution time spent in the first time period relative to total execution time. In block 610, the application checks whether the percentage is below the threshold. If yes ("YES" path of block 610), the application returns to block 606. Otherwise ("NO" path of block 610), in block 612, the application disables interrupt servicing for the hardware thread. In block 614, the application checks whether a number of interrupts per time is below an interrupt threshold. If yes ("YES" path of block 614), in block 616 the application enables interrupt servicing for the hardware thread, then returns to block 606. Otherwise ("NO" path of block 614), in block 618, the application, when the application thread finishes executing, enables interrupt servicing for the hardware thread. Then the application ends.

Thus, a computer implemented method, system or apparatus, and computer program product are provided in the illustrative embodiments for suppressing interrupts to an application thread and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    executing, in a computing system, an application thread on a hardware thread;
    setting, based on a throughput classification and a device class of each of a set of interrupt sources installed in the computing system and based on a first responsiveness classification of the application thread, a first threshold, the first threshold comprising a threshold percentage of interrupt servicing execution time;
    calculating a cumulative percentage of execution time spent servicing a set of interrupts relative to a total execution time since the application thread began executing on the hardware thread, the total execution time comprising a sum of time spent servicing the set of interrupts and time spent executing the application thread;
    disabling, responsive to the cumulative percentage being above the first threshold and a number of hardware threads of the computing system with disabled interrupt servicing being below a second threshold, interrupt servicing on the hardware thread; and
    enabling, subsequent to the disabling of interrupt servicing on the hardware thread, responsive to a rate of interrupts occurring on the computing system within a second measurement time period being below an interrupt enabling threshold, interrupt servicing on the hardware thread, the second measurement time period occurring while interrupt servicing on the hardware thread is disabled, wherein the interrupt enabling threshold comprises a fraction between zero and one of a rate of interrupts occurring on the computing system within a first measurement time period, the first measurement time period occurring prior to disabling of interrupt servicing on the hardware thread, or enabling, subsequent to the disabling of interrupt servicing on the hardware thread and responsive to an ending of execution of the application thread, interrupt servicing on the hardware thread.

2. The computer-implemented method of claim 1, wherein the first threshold is further set based on how many interrupt sources are in the set of interrupt sources installed in the computing system.

3. A computer usable program product comprising one or more computer-readable storage media, and program instructions stored on at least one of the one or more storage media, the stored program instructions comprising:
    program instructions to execute, in a computing system, an application thread on a hardware thread;
    program instructions to set, based on a throughput classification and a device class of each of a set of interrupt sources installed in the computing system and based on a first responsiveness classification of the application thread, a first threshold, the first threshold comprising a threshold percentage of interrupt servicing execution time;
    program instructions to calculate a cumulative percentage of execution time spent servicing a set of interrupts relative to a total execution time since the application thread began executing on the hardware thread, the total execution time comprising a sum of time spent servicing the set of interrupts and time spent executing the application thread;
    program instructions to disable, responsive to the cumulative percentage being above the first threshold and a number of hardware threads of the computing system with disabled interrupt servicing being below a second threshold, interrupt servicing on the hardware thread; and
    program instructions to enable, subsequent to the disabling of interrupt servicing on the hardware thread, responsive to a rate of interrupts occurring on the computing system within a second measurement time period being below an interrupt enabling threshold, interrupt servicing on the hardware thread, the second measurement time period occurring while interrupt servicing on the hardware thread is disabled, wherein the interrupt enabling threshold comprises a fraction between zero and one of a rate of interrupts occurring on the computing system within a first measurement time period, the first measurement time period occurring prior to disabling of interrupt servicing on the hardware thread, or enabling, subsequent to the disabling of interrupt servicing on the hardware thread and responsive to an ending of execution of the application thread, interrupt servicing on the hardware thread.

4. The computer usable program product of claim 3, wherein the first threshold is further set based on how many interrupt sources are in the set of interrupt sources installed in the computing system.

5. The computer usable program product of claim 3, wherein the stored program instructions are stored in the at least one of the one or more storage media of a local data processing system, and wherein the stored program instructions are transferred over a network from a remote data processing system.

6. The computer usable program product of claim 3, wherein the stored program instructions are stored in the at least one of the one or more storage media of a server data processing system, and wherein the stored program instructions are downloaded over a network to a remote data processing system for use in a computer readable storage device associated with the remote data processing system.

7. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to execute, in a computing system, an application thread on a hardware thread;
 program instructions to set, based on a throughput classification and a device class of each of a set of interrupt sources installed in the computing system and based on a first responsiveness classification of the application thread, a first threshold, the first threshold comprising a threshold percentage of interrupt servicing execution time;
 program instructions to calculate a cumulative percentage of execution time spent servicing a set of interrupts relative to a total execution time since the application thread began executing on the hardware thread, the total execution time comprising a sum of time spent servicing the set of interrupts and time spent executing the application thread;
 program instructions to disable, responsive to the cumulative percentage being above the first threshold and a number of hardware threads of the computing system with disabled interrupt servicing being below a second threshold, interrupt servicing on the hardware thread; and
 program instructions to enable, subsequent to the disabling of interrupt servicing on the hardware thread, responsive to a rate of interrupts occurring on the computing system within a second measurement time period being below an interrupt enabling threshold, interrupt servicing on the hardware thread, the second measurement time period occurring while interrupt servicing on the hardware thread is disabled, wherein the interrupt enabling threshold comprises a fraction between zero and one of a rate of interrupts occurring on the computing system within a first measurement time period, the first measurement time period occurring prior to disabling of interrupt servicing on the hardware thread, or enabling, subsequent to the disabling of interrupt servicing on the hardware thread and responsive to an ending of execution of the application thread, interrupt servicing on the hardware thread.

8. The computer system of claim 7, wherein the first threshold is further set based on how many interrupt sources are in the set of interrupt sources installed in the computing system.

* * * * *